US012650245B2

(12) United States Patent
Higel

(10) Patent No.: US 12,650,245 B2
(45) Date of Patent: Jun. 9, 2026

(54) SOLAR HEATING SYSTEM

(71) Applicant: Francois Higel, Montélimar (FR)

(72) Inventor: Francois Higel, Montélimar (FR)

( * ) Notice: Subject to any disclaimer, the term of this patent is extended or adjusted under 35 U.S.C. 154(b) by 623 days.

(21) Appl. No.: 18/026,625

(22) PCT Filed: Sep. 16, 2021

(86) PCT No.: PCT/FR2021/051587
§ 371 (c)(1),
(2) Date: Mar. 16, 2023

(87) PCT Pub. No.: WO2022/058688
PCT Pub. Date: Mar. 24, 2022

(65) Prior Publication Data
US 2023/0332802 A1     Oct. 19, 2023

(30) Foreign Application Priority Data
Sep. 18, 2020    (FR) ...................................... 2009456

(51) Int. Cl.
*F24S 10/50*         (2018.01)
*B23K 26/352*        (2014.01)
(Continued)

(52) U.S. Cl.
CPC .......... *F24S 10/504* (2018.05); *B23K 26/355* (2018.08); *F24H 1/54* (2022.01); *F24S 70/20* (2018.05);
(Continued)

(58) Field of Classification Search
CPC ......... F24S 10/504; F24S 70/20; H02S 40/44; B23K 26/355; F24H 1/54; F28F 13/02
(Continued)

(56) References Cited

U.S. PATENT DOCUMENTS 4,063,544 A * 12/1977 Bowen .................... F24S 10/75
126/704
2012/0145223 A1     6/2012  Weekley
(Continued)

FOREIGN PATENT DOCUMENTS

FR          2787868 A1     6/2000
FR          2983221 A3     5/2013
(Continued)

OTHER PUBLICATIONS

International Search Report and Written Opinion, Application No. PCT/FR2021/051587, mailed Dec. 22, 2021 (19 pages).
(Continued)

*Primary Examiner* — Vivek K Shirsat
(74) *Attorney, Agent, or Firm* — Falcon Rappaport & Berkman LLP

(57) ABSTRACT

A solar heating system for heating domestic water or a heat transfer heating fluid has at least one external heating element which receives solar energy. The heating element is in the form of a panel which is formed by a first plate and a second plate which is connected to the first plate, the first and second plates being symmetrically profiled so as to form, outside contact zones between the first plate and the second plate, a flow channel for the passage of the domestic water or the heat transfer heating fluid which is to be heated and which flows in the panel. The first plate and second plate are deep-drawn from steel and connected to each other by laser welding over the entire surface of the contact zones. At least one of the first plate or the second plate has been subjected to surface texturing by laser processing.

10 Claims, 2 Drawing Sheets

(51) Int. Cl.

| | |
|---|---|
| *F24H 1/54* | (2022.01) |
| *F24S 70/20* | (2018.01) |
| *F28F 13/02* | (2006.01) |
| *H02S 40/44* | (2014.01) |

(52) U.S. Cl.
CPC ............... *F28F 13/02* (2013.01); *H02S 40/44*
(2014.12); *F28F 2275/067* (2013.01)

(58) Field of Classification Search
USPC ......................... 126/563, 653, 658, 375, 704
See application file for complete search history.

(56) References Cited

U.S. PATENT DOCUMENTS

| | | | |
|---|---|---|---|
| 2016/0298875 A1* | 10/2016 | Dellea ..................... | F24S 70/60 |
| 2018/0269828 A1 | 9/2018 | Beck | |
| 2020/0052646 A1* | 2/2020 | Fischer .................. | H02S 40/44 |

FOREIGN PATENT DOCUMENTS

| | | |
|---|---|---|
| GB | 2023795 A | 1/1980 |
| WO | 2019122655 A1 | 6/2019 |

OTHER PUBLICATIONS

Search Report, Application No. FR 2009456, mailed May 31, 2021
(10 pages).

* cited by examiner

SOLAR HEATING SYSTEM

CROSS REFERENCE TO RELATED APPLICATIONS

This application is the U.S. National Stage of International Application Number PCT/FR2021/051587 filed on Sep. 16, 2021, which application claims priority under 35 USC § 119 to French Patent Application No. 2009456 filed on Sep. 18, 2020. Both applications are hereby incorporated by reference in their entirety.

TECHNICAL FIELD

The present invention relates to a solar heating system for heating domestic water or a heat transfer heating fluid comprising at least one heating element installed outside a building and intended to receive solar energy for heating by heat exchange the domestic water or the heat transfer heating fluid, the heating element being in the form of a heat absorbing panel, the panel being formed of a first plate and of a second plate connected to the first plate, the first plate and the second plate being profiled symmetrically so as to form between the first plate and the second plate, outside contact zones between the first plate and the second plate, a flow channel with a fluid inlet and a fluid outlet for the passage of the domestic water or of the heat transfer heating fluid which is to be heated and which flows in the panel.

PRIOR ART

It is known to heat domestic or heating water by recovering solar energy and transmitting it to a heat transfer fluid which may be the water intended to be used or another fluid. Solar heating systems of this type are already known. This may be a metallic material that may comprise, for example, an absorber device consisting of a copper tube bearing a plurality of aluminum fins to increase the exchange surface. The tube is generally mounted in a support housing leaving a space acting as an air gap between the tube which becomes a heat exchanger and a translucent cover plate allowing the rays of the sun to pass and increasing the temperature of the air gap in contact with the tube by greenhouse effect. Nevertheless, in geographic areas where it freezes, the fluid that flows in the tube may consist of a mixture of water and an antifreeze product, which requires the installation of a second heat exchanger in contact this time with the domestic hot water to be used.

In the case of a heating system as described above, it is possible to directly use the heat transfer fluid flowing in the tube for circulation in heating radiators. The heating system will therefore require special maintenance. In the context of heating systems with a mainly metal structure, the manufacture of these systems is made complex by assembly and welding problems. The assembly is very heavy, which leads to constraints for installing these systems, for example on building roofs. Furthermore, these systems are often bulky.

Manufacturers have then sought to develop lighter, less bulky systems that are easier to install. Thus, document FR2787868 describes a solar collector system for heating a heat transfer fluid with a support housing having a translucent cover plate, the housing having a bottom wall and side walls made of a molded composite synthetic material. In the housing, the system for exchanging heat with the heat transfer fluid consists of a ribbed plate, also made of a molded composite synthetic material that absorbs heat and defines a flow channel for the passage of the domestic water to be heated, leaving a gap relative to the translucent cover plate. Plates made of molded synthetic material may also be assembled together by thermoforming to form a panel, wherein the domestic or heating water, as heat transfer fluid, flows. Nevertheless, this type of synthetic material system is often associated with an insulator that stores heat to the detriment of domestic or heating water to be heated.

Documents FR 2 983 221, GB 2 023 795 and US 2012/0145223 describe examples of devices using solar energy which can be used to transfer heat to a fluid.

In order to meet the geographical constraints to ensure use in winter for heating a building as well as in summer for heating the water of a swimming pool, for example, manufacturers have sought to develop new systems for solar heating domestic water or heating not having the aforementioned drawbacks.

DISCLOSURE OF THE INVENTION

The object of the invention is to propose a novel system for solar heating of domestic water or heating, having high energy performance, great comfort, with ease and speed of installation.

For this purpose, a subject matter of the invention is a system for solar heating of domestic water or of a heat transfer heating fluid comprising at least one heating element installed on the outside of a building and intended to receive solar energy for heating by heat exchange the domestic water or the heat transfer heating fluid, the heating element being in the form of a heat absorbing panel, the panel being formed of a first plate and of a second plate connected to the first plate, the first plate and the second plate being profiled symmetrically so as to form between the first plate and the second plate, outside contact zones between the first plate and the second plate, a flow channel with a fluid inlet and a fluid outlet for the passage of the domestic water or of the heat transfer heating fluid to be heated flowing in the panel, wherein the first plate and the second plate are stamped steel plates and are connected together by welding over all the surface of the contact zones between the first plate and the second plate, in that the weld between the plates is a laser weld, and in that a surface texture obtained by laser processing is present on at least one of the first plate or the second plate, and in that the surface texture obtained by laser processing is present on an outer surface of the first plate or the second plate of the panel, the outer surface being able to receive solar energy.

The invention may also have the following features:

the surface texture obtained by laser processing may also be present on a surface in contact with the domestic water or the heat transfer fluid for heating of at least one of the first plate and/or the second plate in order to increase the heat exchange surface area between the panel and the domestic water or the heat transfer heating fluid to be heated;

the flow channel may be arranged in serpentine form;

the first plate and the second plate may each have a thickness in the range of 1 to 5 mm, the flow channel may have a width in the range of 3 to 10 cm and a height in the range of 2 to 4 mm, one end of the flow channel of a panel connected with the fluid inlet and the other end of the flow channel of the panel connected to the fluid outlet of the panel may be connectable to a system for supplying domestic water to be heated or a system for circulating heat transfer heating fluid to be heated;

several panels may be fluidly connectable to one another;

attachment means may be arranged on the border of the panel for mounting it on structural support elements;

the heating element in the form of a panel may be combined with a photovoltaic panel so as to recover heat from the photovoltaic panel in the panel.

The invention may extend to the use of a solar heating system according to the invention for heating the water of a swimming pool.

The invention may also extend to a solar water heater, which comprises a solar heating system according to the invention which is associated with a tank for collecting heated domestic water.

According to the invention, the heating system is very efficient. Indeed, the heating element in the form of a steel panel recovers more solar energy to be transmitted to a liquid to be heated, such as water, than solar heating systems of the prior art with spaced tubes or synthetic materials. Due to the thinness of the plates and the small inner volume of the channel, and therefore of the liquid to be heated, there is a very low heating inertia. The installation is easy and can be done quickly, making it accessible to non-professionals by the design of the panel and its low weight.

Due to the stamped configuration of the plates, the laser welding of the steel plates guarantees the attachment of the plates to one another as well as the sealing of the panel.

The surface modification by laser processing of the outer and/or inner surface of at least one of the plates of the panel, in particular the outer surface facing the solar radiation, makes it possible to create a sort of surface texture that increases the heat absorption capacity from the sun of the panel so as to increase the efficiency of the heating element, compared to a plate not processed with a laser.

Finally, the stainless steel heating element makes it possible to use the heating system to heat domestic water, water from a swimming pool or any heat transfer fluid. Advantageously, the use of water as heat transfer heating fluid makes it possible to limit the maintenance of the heating system.

BRIEF DESCRIPTION OF THE DRAWINGS

The present invention will be better understood and other features will become apparent on reading the detailed description of the embodiments by way of non-limiting example and illustrated by the appended drawings, in which.

DESCRIPTION OF THE EMBODIMENTS

The present invention relates to the field of solar heating in order to recover solar energy from solar radiation and to transmit it to domestic water or to a heat transfer heating fluid. The invention is more particularly dedicated to a solar heating system for directly heating the domestic water or the heat transfer heating fluid, from a heating element installed outside a building so as to recover solar energy, without having to use an intermediate heat exchanger system.

The general principle is to use the solar energy received by the heating element wherein the domestic water or the heat transfer heating fluid to be heated circulates, in order to limit the environmental impact compared to current polluting heating systems.

Figure 1:
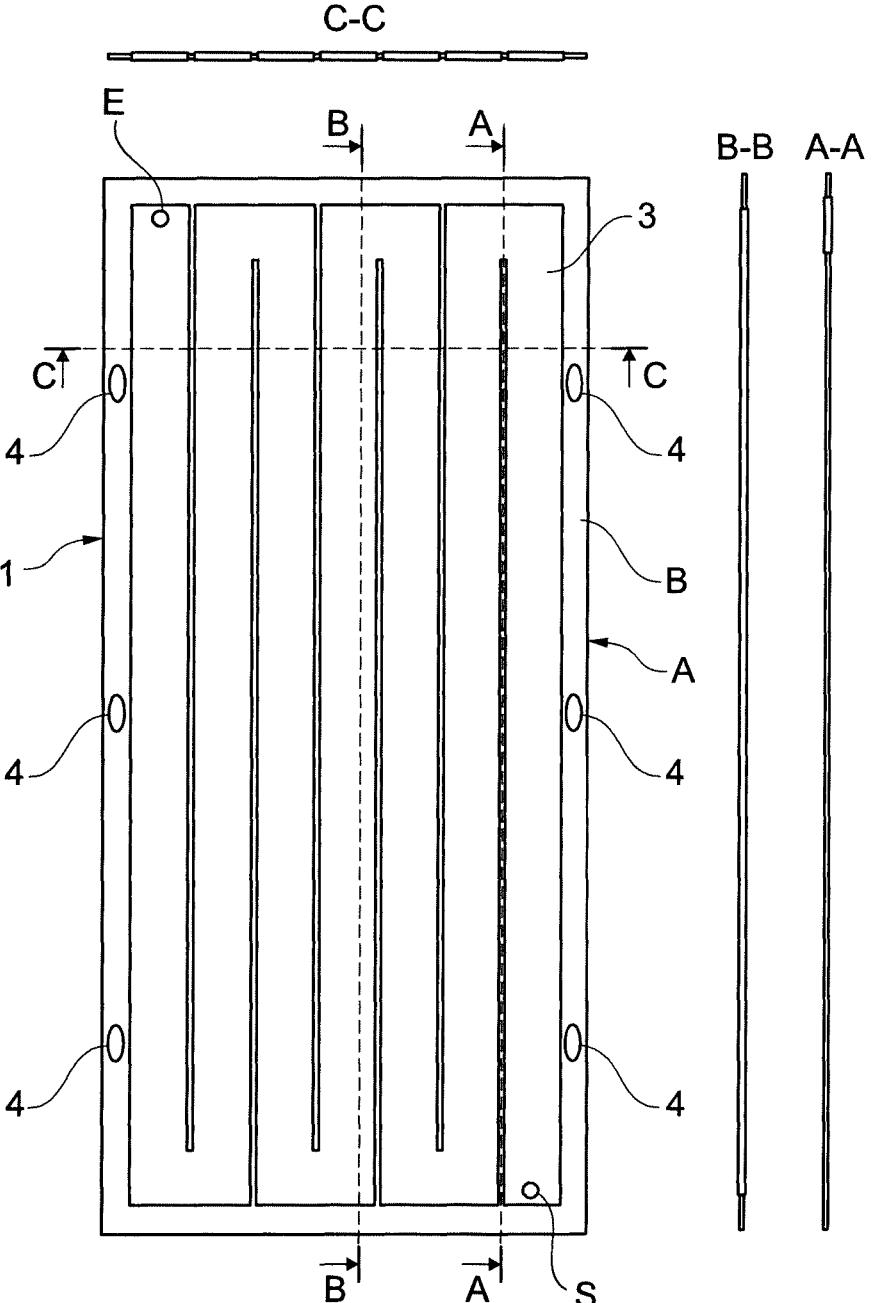
FIG. 1 is a schematic depiction of a heat exchange element in the form of a panel of the solar heating system according to the invention with views along three sections A-A, B-B and C-C.

According to the invention, the heating element is in the form of a panel 1 of the type shown in FIG. 1. Without restriction of size, the panel 1 illustrated in FIG. 1 measures approximately 1 meter by 0.5 meter. The panel 1 comprises a first plate A and a second plate B connected to the first plate A.

For reasons of comprehension, but without limitation to the present invention, the first plate A will be called lower, the second plate B will be called upper, the upper plate being the one oriented in the direction of the sky in order to recover solar energy.

The first plate A and the second plate B are made of steel, preferably of stainless steel. The plates A, B are profiled and may be obtained by stamping so as to locally form a relief on the first plate A and the second plate B, the stamping making it possible to create more angular shapes compared with other known methods of forming a plate. Preferably, as illustrated in FIG. 1, the first plate A and the second plate B are stamped symmetrically so that, when the first plate A and the second plate B are superimposed facing one another to form the panel 1, contact zones between them are created through which the first plate A and the second plate B will be connected, and non-contact zones which form a sort of flow channel 3 for the passage of the domestic water or the heat transfer heating fluid to be heated.

According to the invention, in order to connect the first plate A and the second plate B in a sealed manner and thus form a closed volume for the circulation of the domestic water or the heat transfer heating fluid in the panel 1 between a fluid inlet E and a fluid outlet S, preferably arranged on the second upper plate B, the first plate A and the second plate B are subjected to laser welding on the contact zones. Thus, laser welding is carried out on the edges of the first plate A and the second plate B and between the stamped zones forming the relief which is oriented toward the exterior of the panel, as can be seen in sections A-A, B-B and C-C of FIG. 1.

The flow channel 3 between the inlet E and the outlet S here is arranged in serpentine form. Advantageously, the domestic water or the heat transfer heating fluid comes into direct contact with the heated panel 1 thanks to the solar radiation, and the serpentine configuration makes it possible to direct the domestic water or the heat transfer heating fluid so that the circulation covers practically the entirety of the inner surface of the panel 1.

According to the invention, the first plate A and the second plate B each have a thickness chosen from a range of 1 to 5 mm, making it possible to create the serpentine flow channel 3 extending longitudinally and having for example a width in a range of 3 to 10 cm and a height in a range of 2 to 4 mm.

To connect the heating element in the form of a panel 1 to a system for supplying domestic water or to a system for circulating heat transfer heating fluid, pipes can be crimped at the fluid inlet E and the fluid outlet S of the panel 1, at each end of the flow channel 3.

Figures 2, 3, 4, 5, 6:
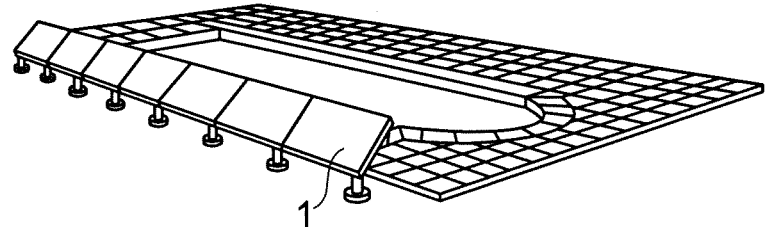
FIG. 2 is a schematic depiction of several heating elements in the form of a panel of the solar heating system according to the invention arranged on a roof of a dwelling.
FIG. 3 is a schematic depiction of a roof of a residence on which a solar heating system according to the invention is in the process of installation with several panels connected to one another.
FIG. 4 is an enlargement of the textured outer surface of a heating element in the form of a panel of the solar heating system according to the invention.
FIG. 5 is a schematic depiction of a heating element in the form of a panel of the solar heating system according to the invention cooperating with a photovoltaic solar panel.
FIG. 6 is a schematic depiction of a solar heating system according to the invention with several heating elements in the form of a panel that are connected to one another and arranged in series.

According to the invention, heating elements in the form of a panel of a heating system can be installed on the roof of a building as illustrated in FIG. 2.

Thus, the heating system may be used for individual, public or domestic hot water heating. In the latter case, the solar heating system according to the invention may be associated with a control loop and a collection and storage tank for storing the heated domestic water produced.

FIG. 3 shows a plurality of heating elements fluidly connected to one another. For this, for example a fluid inlet E of a first panel 1 can be connected to an inlet of domestic water by a connecting pipe, the fluid outlet S of the first panel 1 being able to be directly connected in series by a connecting pipe to the fluid inlet E of a second panel 1, the fluid outlet S of which can be connected by a connecting pipe to the fluid inlet E of a third panel 1, etc., until the fluid outlet S of the last panel 1 is connected by a connecting pipe to a tank for collecting heated domestic water.

In the case of a solar heating system of heat transfer heating fluid, the heat transfer fluid circulates for example via a circulation pump, and the heated heat transfer heating fluid can directly supply any heating network using a hot heat transfer fluid, such as floor heating, radiators, air heaters, fan-coil units etc.

It will be understood that for the installation of the solar heating system according to the invention as illustrated in FIG. 3, attachment means 4 such as for example oblong holes visible in FIG. 1 can be arranged at the edge of the panel 1 in order to line up the panel on structural support elements 5 such as, for example, a frame made of wood or metal arranged on the roof.

Advantageously, the heating elements in the form of a panel 1 of a solar heating system according to the invention can be installed on a roof regardless of the configuration of the building, whether new or in renovation, whether the roof is flat or sloping, whether on a roof with tile or sheet metal covering. It could also be envisaged to install one or more heating elements on the wall of an external facade or on the ground on a frame as illustrated in FIG. 6, or even on the ground.

According to the invention, because the panel 1 is ultra-thin relative to the heating elements of the prior art, a panel 1 for example having a size of 1 meter by 0.5 meter weighs about 5 kg and can therefore be easily carried by a single installer to be mounted on a roof. Since the panels 1 do not have a particular fluid flow direction, their mounting will be facilitated. Because the panel 1 is made of steel, it is robust to extreme environmental conditions, such as hail or freezing. It is also possible to walk on top when installed on the roof.

Furthermore, since the walls of the panel 1 are thin and the volume of domestic water or heat transfer heating fluid to be heated circulating in the flow channel 3 in the panel 1 is limited by the reduced size of the channel 3 relative to the prior art, the temperature of the domestic water or heat transfer heating fluid rises very rapidly, which makes it possible to use the heating system according to the invention even if the sky is overcast.

According to the invention, a surface modification by laser processing, schematized by waves in FIG. 4, can be carried out on the panel 1.

The surface modification by laser processing provides a sort of texturing of the treated surface so as to obtain a surface texture, and it can be carried out on the outer surface of the first lower plate A and/or the second upper plate B of the panel 1, preferably at least on the one that will be oriented toward the sky in order to recover solar energy. This surface modification makes it possible to increase the surface area receiving the solar radiation in order to recover more solar energy for the heating system according to the invention and thus to increase the efficiency of the heating element relative to an unmodified panel 1. According to the invention, a surface modification by laser processing may also be carried out on the inner surface of the panel 1 in contact with the domestic water or the heat transfer heating fluid. This surface modification is carried out on the inner surface of at least one of the first lower plate A and the second upper plate B. Preferably, this surface modification is carried out on the inner face of the second upper plate B so as to increase the exchange surface between the domestic water or the heat transfer heating fluid and the panel 1. Indeed, the distance traveled by the domestic water or the heat transfer heating fluid is higher on the internally modified first plate A and/or the second plate B than on the unmodified first plate A and/or the second plate B. Such a surface modification may for example increase the efficiency of the heating element relative to an unmodified panel.

Advantageously, the surface texturing by laser processing can be carried out on the outer surface and the inner surface of the panel 1.

Advantageously, the conductive material of the panel 1 of a solar heating system, such as stainless steel, makes it possible to heat water but also to use any heat transfer heating fluid. The heat transfer heating fluid may be water or any other antifreeze liquid such as glycol.

In the case where the heat transfer heating fluid is water or the heating system is used to heat domestic water, the maintenance procedures for the facility can advantageously be limited to, for example, a simple backflushing of the panel 1. Furthermore, since the panel is airtight and the material of the panel is made of stainless steel, there is no risk of oxygenation of the water or the fluid.

In order to further increase the efficiency of the solar heating system according to the invention, as illustrated in FIG. 3, an insulating deflector may be installed below the heating elements in the form of a panel 1, preferably by leaving an air gap between the insulating deflector and the panel 1, so that the insulator does not store the heat from the panel 1 but rather returns it to the panel 1.

It could also be envisaged to combine a heating element in the form of a panel of a solar heating system according to the invention with a photovoltaic panel. Indeed, it is known that a photovoltaic panel above a temperature of 25° C. is no more effective than a photovoltaic panel at 25° C. It is then advantageous to recover the accumulated heat from the photovoltaic panel in order to heat a heating element in the form of a panel 1 of the solar heating system according to the invention. An example of assembly is shown in FIG. 5. It could thus be assembled on a frame ready to be installed on a roof, a sheet 6 for example made of aluminum on which an insulating deflector 7 rests, separated by an air gap of a heating element in the form of a panel 1, the latter being itself separated by an air gap from a photovoltaic panel 8. The heat accumulated by the photovoltaic panel 8 by the solar radiation is thus transmitted to the panel 1 wherein for example a heat transfer heating fluid circulates, which can be sufficient to supply the heating system if the latter is at low temperature. In this configuration it is indirect solar heating that is created, and the heating system according to the invention serves at the same time as cooler of photovoltaic panels.

The solar heating system according to the invention may also be used in mid-season or summer season to heat the water from a swimming pool, as illustrated in FIG. 6. One or more heating elements in the form of a panel of a heating system according to the invention can just be coupled to a filtration of the swimming pool water. Indeed, water from a swimming pool can circulate in the flow channel 3 of a panel 1 without for example the chlorine attacking the interior of the stainless steel panel 1. In FIG. 6, several panels 1 are assembled and connected in series.

It will be understood that the solar heating system according to the invention has high energy performance, and it is not polluting. Installation is very quick and easy.

It goes without saying that the present invention is not limited to the embodiment disclosed above, and is capable of undergoing modifications without departing from the scope of the invention.

The invention claimed is:

1. A system for solar heating of domestic water or of a heat transfer heating fluid comprising at least one heating element installed on the outside of a building and intended to receive solar energy for heating by heat exchange said domestic water or said heat transfer heating fluid, said heating element being in the form of a heat absorbing panel, said panel being formed of a first plate and of a second plate connected to said first plate, said first plate and said second plate being profiled symmetrically so as to form between said first plate and said second plate, outside contact zones between said first plate and said second plate, a flow channel with a fluid inlet and a fluid outlet for the passage of said domestic water or of said heat transfer heating fluid to be heated flowing in said panel, characterized in that said first plate and said second plate are stamped steel plates and are connected together by welding over all the surface of the contact zones between said first plate and said second plate, in that said weld between the plates is a laser weld, and in that a surface texture obtained by laser processing is present on at least one of said first plate and said second plate, and in that said surface texture obtained by laser processing is present on an outer surface of said first plate or said second plate of said panel, said outer surface being able to receive solar energy;

wherein said surface texture obtained by laser processing is also present on a surface in contact with said domestic water or said heat transfer fluid for heating at least one of said first plate and/or said second plate to increase the heat exchange surface area between said panel and said domestic water or said heat transfer heating fluid to be heated.

2. The solar heating system according to claim 1, wherein said flow channel is arranged in serpentine form.

3. The use of a solar heating system according to claim 1 for heating the water of a swimming pool.

4. A solar water heater, comprising a solar heating system for solar heating of domestic water or of a heat transfer heating fluid comprising at least one heating element installed on the outside of a building and intended to receive solar energy for heating by heat exchange said domestic water or said heat transfer heating fluid, said heating element being in the form of a heat absorbing panel, said panel being formed of a first plate and of a second plate connected to said first plate, said first plate and said second plate being profiled symmetrically so as to form between said first plate and said second plate, outside contact zones between said first plate and said second plate, a flow channel with a fluid inlet and a fluid outlet for the passage of said domestic water or of said heat transfer heating fluid to be heated flowing in said panel, characterized in that said first plate and said second plate are stamped steel plates and are connected together by welding over all the surface of the contact zones between said first plate and said second plate, in that said weld between the plates is a laser weld, and in that a surface texture obtained by laser processing is present on at least one of said first plate and said second plate, and in that said surface texture obtained by laser processing is present on an outer surface of said first plate or said second plate of said panel, said outer surface being able to receive solar energy, said solar water heater associated with a tank for collecting heated domestic water, wherein said surface texture obtained by laser processing is also present on a surface in contact with said domestic water or said heat transfer fluid for heating at least one of said first plate and/or said second plate to increase the heat exchange surface area between said panel and said domestic water or said heat transfer heating fluid to be heated.

5. The solar heating system according to claim 1, wherein said first plate and said second plate each have a thickness in the range of 1 to 5 mm.

6. The solar heating system according to claim 1, wherein said flow channel has a width in the range of 3 to 10 cm and a height in the range of 2 to 4 mm.

7. The solar heating system according to claim 1, wherein one end of said flow channel of a panel connected with said fluid inlet and that the other end of said flow channel of said panel connected to said fluid outlet of said panel are connectable to a system for supplying domestic water to be heated or a circulation system for heat transfer heating fluid to be heated.

8. The solar heating system according to claim 1, wherein several panels are fluidly connectable to one another.

9. The solar heating system according to claim 1, wherein attachment means are arranged at the edge of said panel for mounting the panel on structural support elements.

10. The solar heating system according to claim 1, wherein said heating element in the form of a panel is combined with a photovoltaic panel so as to recover heat from said photovoltaic panel in the panel.

* * * * *